(12) United States Patent
Boertjes et al.

(10) Patent No.: US 9,077,474 B2
(45) Date of Patent: Jul. 7, 2015

(54) MAKE BEFORE BREAK OPTICAL MESH NETWORK ELEMENT

(75) Inventors: David Boertjes, Nepean (CA); Gerard Swinkels, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 823 days.

(21) Appl. No.: 13/040,590

(22) Filed: Mar. 4, 2011

(65) Prior Publication Data

US 2011/0222862 A1 Sep. 15, 2011

Related U.S. Application Data

(60) Provisional application No. 61/313,147, filed on Mar. 12, 2010.

(51) Int. Cl.
*H04J 14/00* (2006.01)
*H04J 14/02* (2006.01)

(52) U.S. Cl.
CPC ......... *H04J 14/0212* (2013.01); *H04J 14/0217* (2013.01); *H04J 14/0227* (2013.01); *H04J 14/0297* (2013.01); *H04J 14/0204* (2013.01)

(58) Field of Classification Search
CPC .............. H04J 14/0212; H04J 14/0217; H04J 14/0227; H04J 14/0204; H04J 14/0297; H04J 14/022; H04J 14/0267; H04J 14/0269

USPC .................................. 398/116, 45–57, 12, 19
See application file for complete search history.

(56) References Cited

U.S. PATENT DOCUMENTS

| | | | |
|---|---|---|---|
| 6,512,612 B1 * | 1/2003 | Fatehi et al. ..................... | 398/49 |
| 7,088,919 B2 * | 8/2006 | Graves ............................. | 398/50 |
| 8,121,478 B2 * | 2/2012 | Kash et al. ....................... | 398/50 |
| 2003/0090758 A1 * | 5/2003 | Sparks et al. ................. | 359/117 |

FOREIGN PATENT DOCUMENTS

WO 2010043035 4/2010

* cited by examiner

*Primary Examiner* — M. R. Sedighian
(74) *Attorney, Agent, or Firm* — Kent Daniels; Daniels IP Services Ltd.

(57) ABSTRACT

A network element includes an electronic switch for routing traffic between a plurality of client access ports and a plurality of EO ports, a respective EO interface coupled to each one of the plurality of EO ports; a wavelength selective switch for optically switching optical signals between the EO interfaces and a set of optical transmission fibers; and a control system. The plurality of EO interfaces includes at least one Make Before Break (MBB) EO interface. The control system is operative to reconfigure the network element by identifying an EO interface to be reconfigured. A new optical path is set up through the wavelength selective switch and terminated on the MBB EO interface. The electronic switch is then controlled to re-route a traffic flow traversing the identified EO interface to the MBB EO interface.

6 Claims, 3 Drawing Sheets

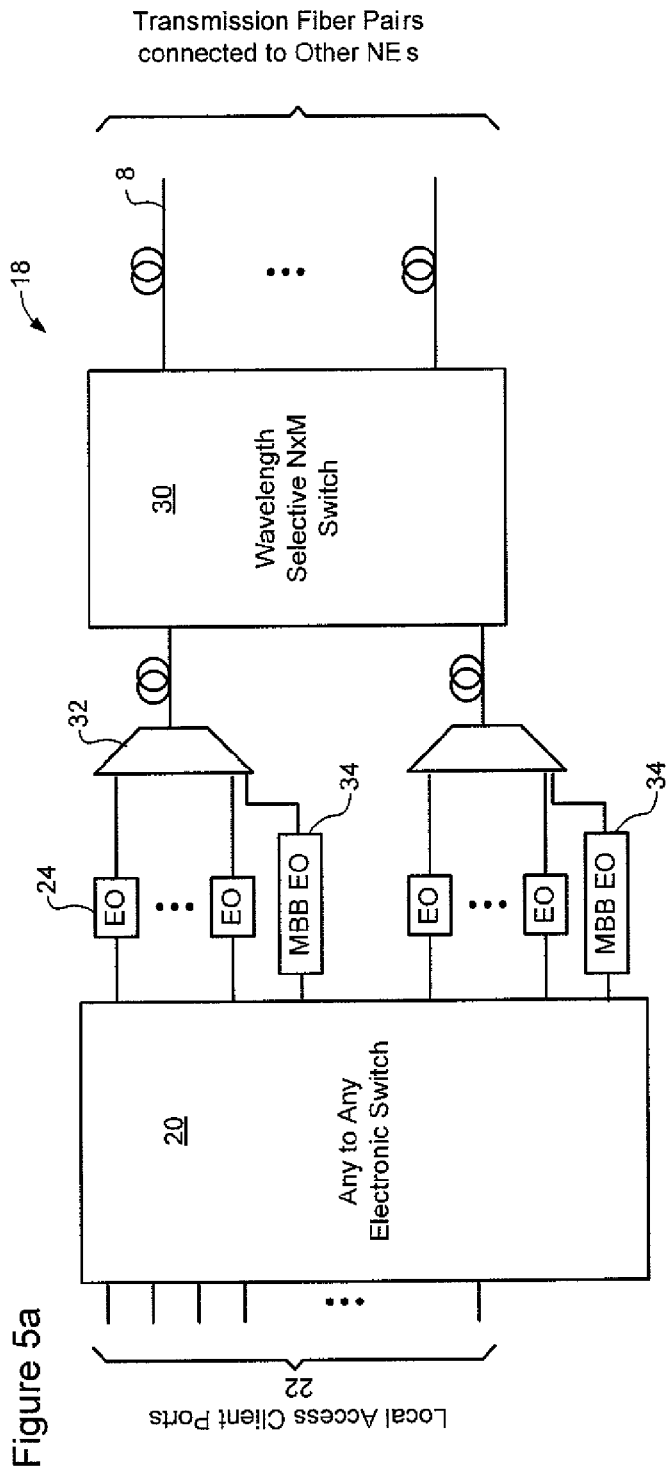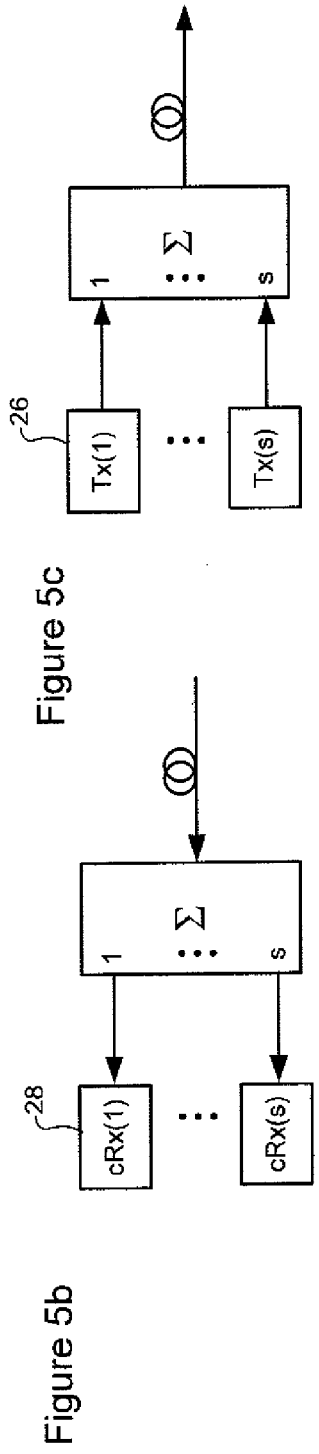
Figure 5a
Figure 5b
Figure 5c

MAKE BEFORE BREAK OPTICAL MESH NETWORK ELEMENT

CROSS-REFERENCE TO RELATED APPLICATIONS

This application is based on, and claims benefit of U.S. Provisional Patent Application No. 61/313,147 filed Mar. 12, 2010, the entire content of which is hereby incorporated herein by reference.

MICROFICHE APPENDIX

Not Applicable.

TECHNICAL FIELD

The present invention relates generally to optical communication systems, and in particular to a Make-Before-Break optical mesh network element.

BACKGROUND

Today's Fibre optic transmission systems are employing recent advances in optical switching technology to provide reconfiguration at the optical layer. The networks created in the photonic domain have evolved from simple point-to-point and ring architectures to a more arbitrary photonic mesh.

The increased use of optical switching promises to alleviate some of the cost of the network by eliminating the need for multiple transponder interfaces. It is also desirable to keep the signals in the optical domain for as much of their transit through the network as possible because of the inherent power efficiency of optical components. Optical components have power dissipation several orders of magnitude smaller than the equivalent functions in the electronic domain. However; it is a practical reality that optical switching, especially those which are cost effective and low power, have switching speeds several orders of magnitude slower than their electrical counterparts. Therefore, although there is a potential savings in cost (both capital and energy), there is a penalty in the performance of such an entirely optical network in terms of reconfiguration speed.

A second problem which is an issue for optical switching is the creation of a so-called make-before-break switch. Electrical switches of this type are common as are their electronic, digital equivalents. Optical switches; however, since they work by splitting and redirecting optical power, make it much more difficult to create such a function.

Prior to the introduction of photonic switches, all reconfiguration had to be performed in the electronic domain. FIG. 1 shows an example of a network element (NE) 2 where all of the switching and routing functions are performed in the electronic domain. In this arrangement, an Any-to-Any electronic switch 4 is used to interconnect N local access client ports and M electro-optic (EO) interfaces. 6. Each EO interface 6 is connected to a transmission fiber pair 8 via a MUX/DeMUX block 10. Each fiber pair 8 provides a bi-directional optical connection to an adjacent NE for a Dense Wavelength Division Multiplexed (DWDM) signal. Thus, for each fibre pair 8 there must be a corresponding EO interface 6 for each wavelength channel of the DWDM signal, such that all directions may be used.

Typically, each EO interface 6 includes a transmitter (Tx) and a receiver (Rx) which are respectively configured to transmit and receive a predetermined wavelength channel. In some cases, the Tx and Rx may be tuneable, but this is not essential, particularly in cases in which passive filter-based MUX/DeMUX blocks 10 are used.

A mesh network can be created by interconnecting many of these NEs with fibre paths 8. Note that optical amplifiers typically used to overcome the loss of the multiplexing and demultiplexing components as well as the loss of the transmission fibres have been omitted to simplify the drawing for the sake of clarity.

The electronic switch 4 provides connectivity between the client access ports where traffic enters and leaves the network and the EO interfaces 6 which send/receive signals through respective fibre pairs 8. As such the switch 4 also provides an interconnection path between EO interfaces 6 connected to respective different fibre pairs 8, and so also provides connectivity for signals to transit the NE 2.

An advantage of this arrangement is high speed of reconfiguration and the ability to set-up new paths and validate their performance before switching to them; a process often called "bridge and switch" in the field. In addition, the transmission between NE's is performed in the optical domain which is commensurate with the goal of using optical transmission technology for its inherent efficiency.

A major disadvantage of this implementation comes in the amount of equipment required to support reconfiguration. In order to have arbitrary re-configurability in this NE, each direction (fiber pair 8) must be equipped with enough EO interfaces (transponders) 6 to support the maximum cross-section of traffic carrying capacity. In addition, this implies that the electronic switch 4 must also support this capacity in a non-blocking fully reconfigurable fashion.

Another disadvantage is the power dissipation of the solution. As pointed out earlier, optical switching, although slower than electronic, is much less power hungry. Also, since all of the switching is performed in the electronic domain, there is the additional inefficiency and added latency of the Optical-to-Electrical and Electrical-to-Optical conversion of all signals transiting the node.

With the introduction of photonic switches, reconfiguration can now be performed in the optical domain. FIGS. 2-4 show examples of network elements where all of the switching and routing functions are performed in the optical domain. A mesh network is created by interconnecting many of these NE's with fibre paths.

There are two categories of optical switch shown in these examples. The first category, as shown in FIG. 2 and FIG. 3, is based on the use of wavelength selective optical switches 12, either alone (as shown in FIG. 2) or together with optical splitters in a wavelength agnostic or space-switch 14, as shown in FIG. 4. The advantages and disadvantages of each will become clear as they are explained.

A main advantage of wavelength selective switching is the minimal interconnect. Both the local client ports and the line ports of a wavelength selective switch (WSS) 12 (FIG. 2) convey DWDM signals, which dramatically reduces the number of fibres required for interconnect. However, since a MUX/DeMUX block 10 must be placed between the WSS 12 and the EO interfaces 6, each interconnect fibre must contain only one copy of each of the DWDM wavelengths which is commonly referred to as wavelength contention. Therefore, re-use of channels must take place across multiple MUX and DeMUX elements.

Another advantage has to do with the means of achieving wavelength selectivity. The WSS 12 can switch individual wavelengths between DWDM ports without intervening fibre (or waveguide). This allows a much wider filter bandwidth in the switch than is possible using a MUX, DeMUX and a switch in between, which leads us to the architecture in FIG. 4.

Using a space switch 16 as shown in FIG. 4 eliminates the problem of wavelength contention but at the expense of many more interconnect fibres. Also, the scale of the space switch 18 can be problematic. Typical systems have channel counts per transmission fibre on the order of 80, such that at a node with 4 directions (each having respective transmit and receive fibers) and adding and dropping 50% of the traffic locally, the switch size must be at least 960×960.

In addition, all of the channels which are transiting the node must pass through the MUX/DeMUX blocks 10 on their way through the space switch 16, introducing filtering losses which are avoided in the WSS architecture of FIGS. 2 and 3.

Hybrid architectures, where one introduces space switching in combination with MUX and DeMUX along with the WSSs are possible which alleviate the wavelength re-use issues while not introducing the full complement of interconnect.

A major advantage of all-optical implementations is in the reduction of the amount of EO equipment. Each NE need only be equipped with enough EO transponders to support the minimum terminating traffic capacity for that node.

A by-product of this is an advantage in the power dissipation of the solution. As pointed out earlier, optical switching, although slower than electronic, is much less power hungry. Since all of the switching is performed in the optical domain, there is no additional inefficiency of the Optical-to-Electrical and Electrical-to-Optical conversion for signals transiting the node.

Disadvantages of an all-optical implementation include the speed of reconfiguration and the inability to set-up new paths and validate their performance before switching to them; often called "blind switching" in the field.

Techniques which enable the elimination of as many EO transponder interfaces as possible while maintaining overall system flexibility and keeping a low switching time for reconfiguration events remain highly desirable.

SUMMARY

Accordingly, an aspect of the present invention provides a network element includes an electronic switch for routing traffic between a plurality of client access ports and a plurality of EO ports, a respective EO interface coupled to each one of the plurality of EO ports; a wavelength selective switch for optically switching optical signals between the EO interfaces and a set of optical transmission fibers; and a control system. The plurality of EO interfaces includes at least one Make Before Break (MBB) EO interface. The control system is operative to reconfigure the network element by identifying an EO interface to be reconfigured. A new optical path is set up through the wavelength selective switch and terminated on the MBB EO interface. The electronic switch is then controlled to re-route a traffic flow traversing the identified EO interface to the MBB EO interface.

BRIEF DESCRIPTION OF THE DRAWINGS

Representative embodiments of the invention will now be described by way of example only with reference to the accompanying drawings, in which:

FIGS. 5a-5c schematically illustrate elements of a network element implementing make-before break optical switching in accordance with a representative embodiment of the present invention.

It will be noted that throughout the appended drawings, like features are identified by like reference numerals.

DETAILED DESCRIPTION

Figure 1:
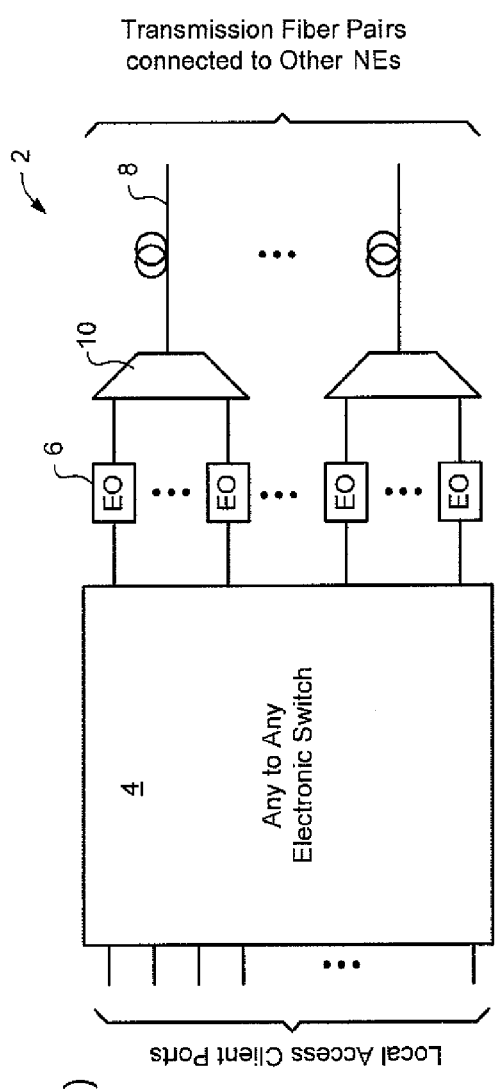
FIG. 1 schematically illustrates elements of a network element implemented using an electronic switch with EO interfaces known in the art.
Figure 2:
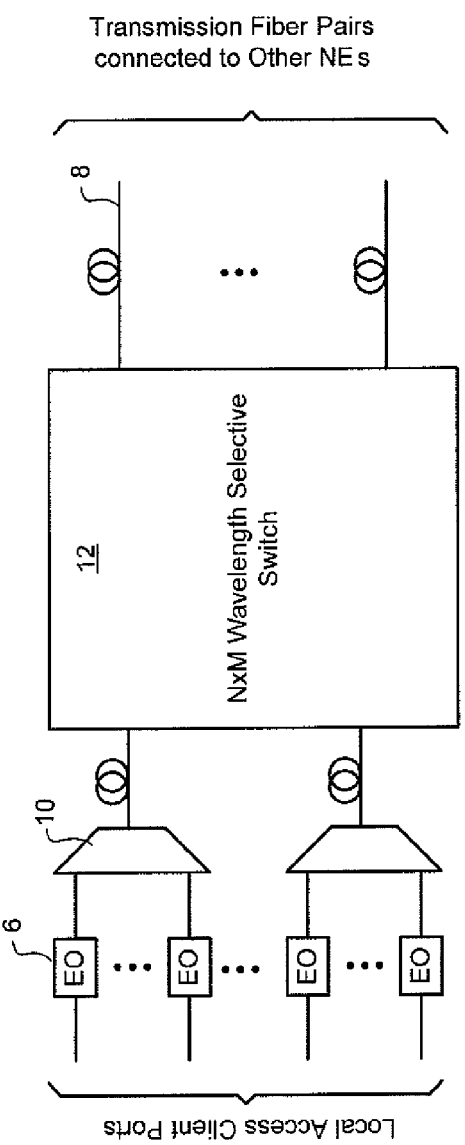
FIG. 2 schematically illustrates elements of a network element implemented using all optical switching based on a wavelength selective switch known in the art.
Figures 3, 4:
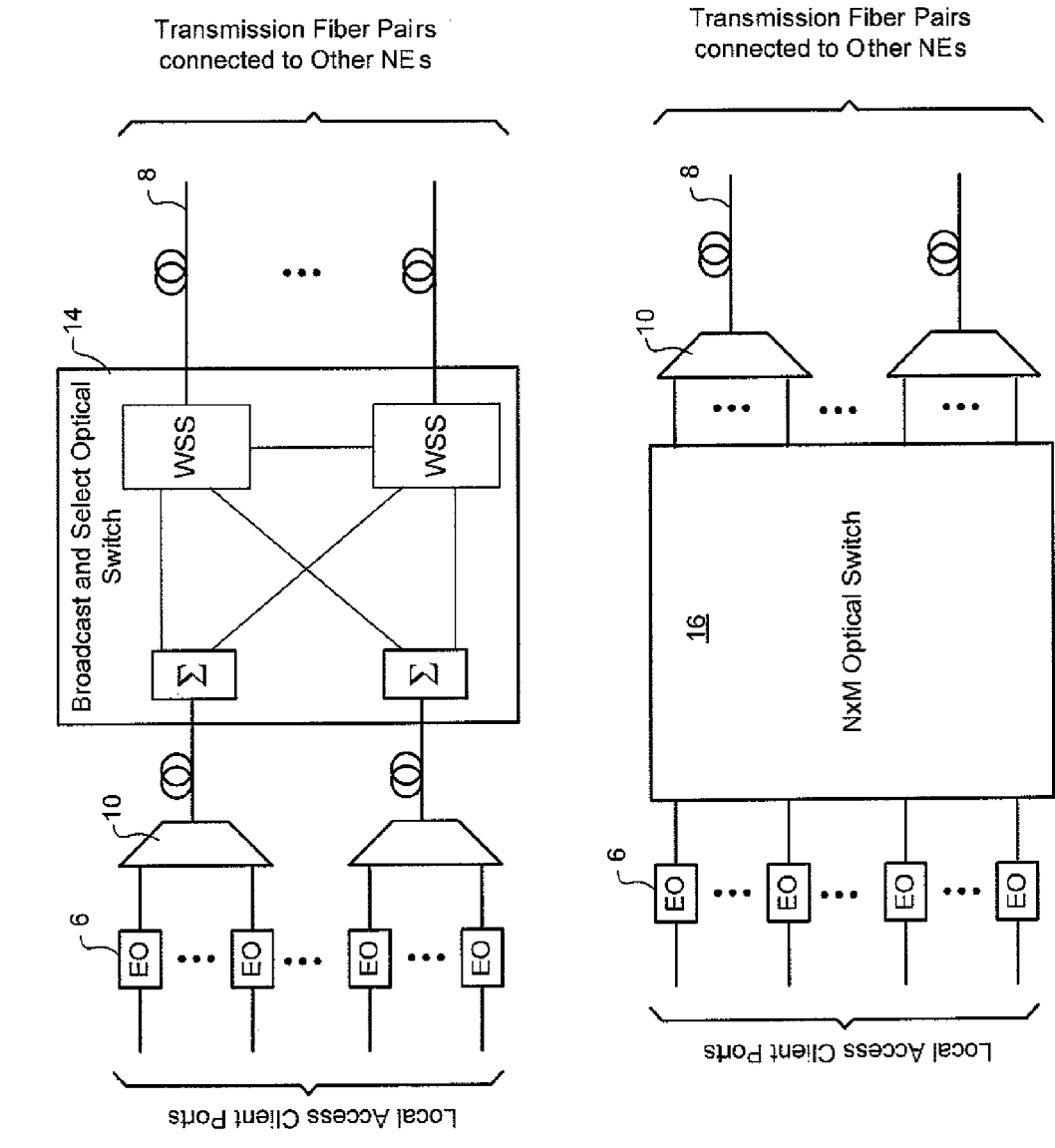
FIG. 3 schematically illustrates elements of a network element implemented based on an implementation of wavelength selective switching using a broadcast and select architecture, known in the art.
FIG. 4 schematically illustrates elements of a network element implemented based on all optical switching using a space switch known in the art.

For the purposes of understanding the present disclosure, the following assumptions are made:

All fibre connections are assumed to be bi-directional. That is, there is a transmit and a receive direction. This may be achieved equivalently through the use of a pair of fibres or bi-directional light propagation on a single fibre.

All components are assumed to be sized to accommodate this bi-directionality including: MUX and DeMUX shown as one trapezoid in the drawings; EO interfaces which consist of a transmitter (Tx) and a receiver (Rx); and Switches which are drawn singly and in one direction should be considered as being doubled and reversed in direction to complete the bi-directional pair.

All EO interfaces are DWDM capable and are assumed to be either completely tunable across the band of interest, or selected appropriately to support the wavelength of interest, as appropriate.

MUX and DeMUX components are meant to combine or separate channels from a single fibre (or waveguide) to multiple fibres (or waveguides). This may be achieved in several ways including: Optical filters; Power combiners or splitters; or either of these elements in combination with coherent receivers as described in Applicant's international patent application Serial No. PCT/CA2009/001455, filed Oct. 15, 2009 and entitled Coherent Augmented Optical Add-Drop Multiplexer.

In very general terms, the present invention provides a network element having a hybrid electronic and optical switching architecture and implementing a make-before-break optical switching technique. A network element in accordance with a representative embodiment of the present invention is shown in FIG. 5.

Referring to FIG. 5a, the network element 18 comprises an electronic switch 20 designed to route traffic to/from any one of a plurality of client access ports 22 and a plurality of working EO interfaces 24. Each working EO interface 24 comprises a respective transmitter (Tx) 26 and Receiver (Rx) 28 (FIGS. 5b and 5c), which are optically coupled to an N×M WSS 30 via a MUX/DeMUX block 32. With this arrangement, the size of the both the electronic and optical switches can be optimized. Thus, the size of electrical switch and the number of EO interfaces can be selected to support the number of client access ports and taking into account path protection (resiliency) requirements, rather than the number of optical channels. This tends to minimize the number of working EO interface(s). The use of a WSS 30 means that the optical switch can also be optimized in terms of its connectivity and optical channel switching capacity.

In the embodiment of FIG. 5, the MUX/DeMUX blocks 32 are preferably colourless, as described in Applicant's International patent application Serial No. PCT/CA2009/001455. Thus, as shown in FIG. 5b, each DeMUX may be provided as a 1:s power splitter, which receives a set of wavelength channels from the WSS 30, and supplies these channels to each one of a corresponding set of s coherent receivers (cRx) 28. Each coherent receiver (cRx) 28 is preferably tuneable, so that it can receive a wavelength channel signal centered an a desired carrier wavelength (or frequency). In some embodiments in which tuneable coherent receivers are used, the frequency range of each receiver may be wide enough to enable the receiver to tune in any channel of the network. In other embodiments, the dynamic range of each receiver may be wide enough to enable the receiver to tune in any one of a predetermined subset of channels of the network. In still other embodiments, each receiver may be non-tuneable. Each coherent receiver must be designed having a Common Mode Rejection Ratio (CMRR) which enables the receiver to receive a selected one channel while rejecting each of the other channels presented to it.

As shown in FIG. 5c, each MUX may be provided as a 1:s power combiner, which combines the channel signals generated by a respective set of transmitters (Tx) 26. Preferably, each transmitter (Tx) 26 is tuneable, so that it can generate a wavelength channel signal centered on a desired carrier wavelength (or frequency). In some embodiments in which tuneable transmitters are used, the dynamic range of each transmitter (Tx) may be wide enough to enable the transmitter (Tx) to generate any channel of the network. In other embodiments, the dynamic range of each transmitter (Tx) may be wide enough to enable the transmitter (Tx) to generate any one of a subset of channels of the network. In still other embodiments, each transmitter (Tx) may be non-tuneable.

As may be appreciated, the arrangement of FIGS. 5b and 5c allows the tunability of the EO interfaces 24 to be used to select and use a desired wavelength channel without manual intervention, i.e. re-connecting a fibre patch cord, etc. However, such a reconfiguration would rely on the optical switch reconfiguration time and would therefore be slower than an electronic switching approach. The present invention overcomes this problem by providing one or more make before break (MBB) EO interfaces 34 (FIG. 5a) connected to the electrical switch 20, which are used as a means to achieve fast reconfiguration in a serial manner. An MBB EO interface 34 is preferably tuneable. In embodiments in which the working EO interfaces 24 are tuneable, as described above with reference to FIGS. 5b and 5c, the difference between a tunable MBB EO interface 34 and the working EO interfaces 24 lies primarily in how each interface is used, and thus any of the working EO interfaces 24 may be re-designated as an MBB EO interface 34.

When a command to reconfigure the node 18 is received, the node 18 serializes the affected channels so as to provide a sequence of actions to follow. For instance, if the reconfiguration was for 4 channels, and there are two MBB EO interfaces 34, then two sets of two channel actions would result. For clarity, we will now step through the actions taken for a single channel reconfiguration in the presence of one MBB EO interface 34. In the present example, the reconfiguration command indicates that a traffic flow allocated to a given channel is to be rerouted to a different channel, which may utilize a different wavelength and/or path through the network.

At a first step, the working EO interface 24 hosting the current channel is identified. Next, the new channel is set up, using the MBB EO interface 34, in a conventional manner. Once the new channel has been established, a bridge can be setup on the new channel so that traffic continuity can be validated in a conventional manner. Once the new channel has been validated, the electronic switch 20 can be controlled re-route the traffic flow from the old EO interface 24 to the MBB EO interface 34. At this point there are two options. A first option is to swap the designated roles of the old EO interface 24 and the MBB EO interface 34. Thus, the MBB EO interface 34 is re-designated as a working EO interface 24, and old EO interface 24 released from the channel that originally carried the traffic flow and designated as an MBB EO interface 34. A second option is to reconfigure the original EO interface 24 to host the new channel, and then the electronic switch 20 controlled to roll the traffic flow back onto this working EO interface 24, before finally releasing the MBB EO interface 34 making it ready for the next action. This latter option is possible in cases where both the original EO interface 24 and the MBB EO interface 34 are optically coupled to the same MUX/DeMUX block 32, because the use of power splitters/combiners in the MUX/DeMUX block 32 (see FIGS. 5b and 5c) means that the new channel wavelength can be hosted by any EO interface 24, 34 without requiring any reconfiguration of the WSS 30.

As may be appreciated, setting up the new channel using the MBB EO interface 34 "makes" the new connection and validates channel continuity, before the old connection is "broken" by releasing the old EO interface. Thus the above-noted methods provide a make-before-break operation, which enables a "hitless" re-routing of traffic flows.

It should be noted that although the reconfiguration time needed for multiple actions is still limited by the optical switch time, maintenance of traffic continuity is limited only by the performance of the electronic switch 20, which typically being digital in nature, can be designed not to impact the traffic flow in any significant manner.

Although the invention has been described with reference to certain specific embodiments, various modifications thereof will be apparent to those skilled in the art without departing from the spirit and scope of the invention as outlined in the claims appended hereto.

We claim:

1. A network element comprising:
   an electronic switch configured to route traffic between a plurality of client access ports and a plurality of electro-optic (EO) ports;
   a respective EO interface coupled to each one of the plurality of EO ports, wherein the plurality of EO interfaces includes at least one Make Before Brake (MBB) EO interface;
   a wavelength selective switch configured to optically switch optical channels between the EO interfaces and a set of optical transmission fibers; and
   a control system operative to:
      identify a first EO interface to be reconfigured, the first EO interface terminating a respective optical channel carrying a first traffic flow;
      set up a new optical channel through the wavelength selective switch and terminated on the MBB EO interface, the new optical channel being configured to carry the first traffic flow; and
      subsequently control the electronic switch to re-route the first traffic flow traversing the first EO interface to the MBB EO interface without interrupting the first traffic flow.

2. A network element as claimed in claim 1, wherein the control system is further operative to:

designate the first EO interface as a new MBB interface; and reassign the MBB EO interface as a working EO interface.

3. A network element as claimed in claim 1, wherein the control system is further operative to:
reconfigure the first EO interface onto the new optical channel; and
control the electronic switch to re-route the first traffic flow traversing the MBB EO interface back to the first EO interface.

4. A method of controlling a network element, the method comprising:
identifying a first electro-optic (EO) interface of the network element to be reconfigured, the first EO interface terminating a respective optical channel carrying a first traffic flow;
setting up a new optical channel through at least a wavelength selective switch of the network element and terminated on a second EO interface, the new optical channel being configured to carry the first traffic flow; and
subsequently controlling an electronic switch of the network element to re-route the first traffic flow traversing the first EO interface to the second EO interface, without interrupting the first traffic flow.

5. A method as claimed in claim 4, further comprising:
designating the first EO interface as a make-before break (MBB) interface; and
reassigning the second EO interface as a working EO interface.

6. A method as claimed in claim 4, further comprising:
reconfiguring the first EO interface onto the new optical channel; and
controlling the electronic switch to re-route the first traffic flow traversing the second EO interface back to the first EO interface.

\* \* \* \* \*